United States Patent Office 3,013,624
Patented Dec. 19, 1961

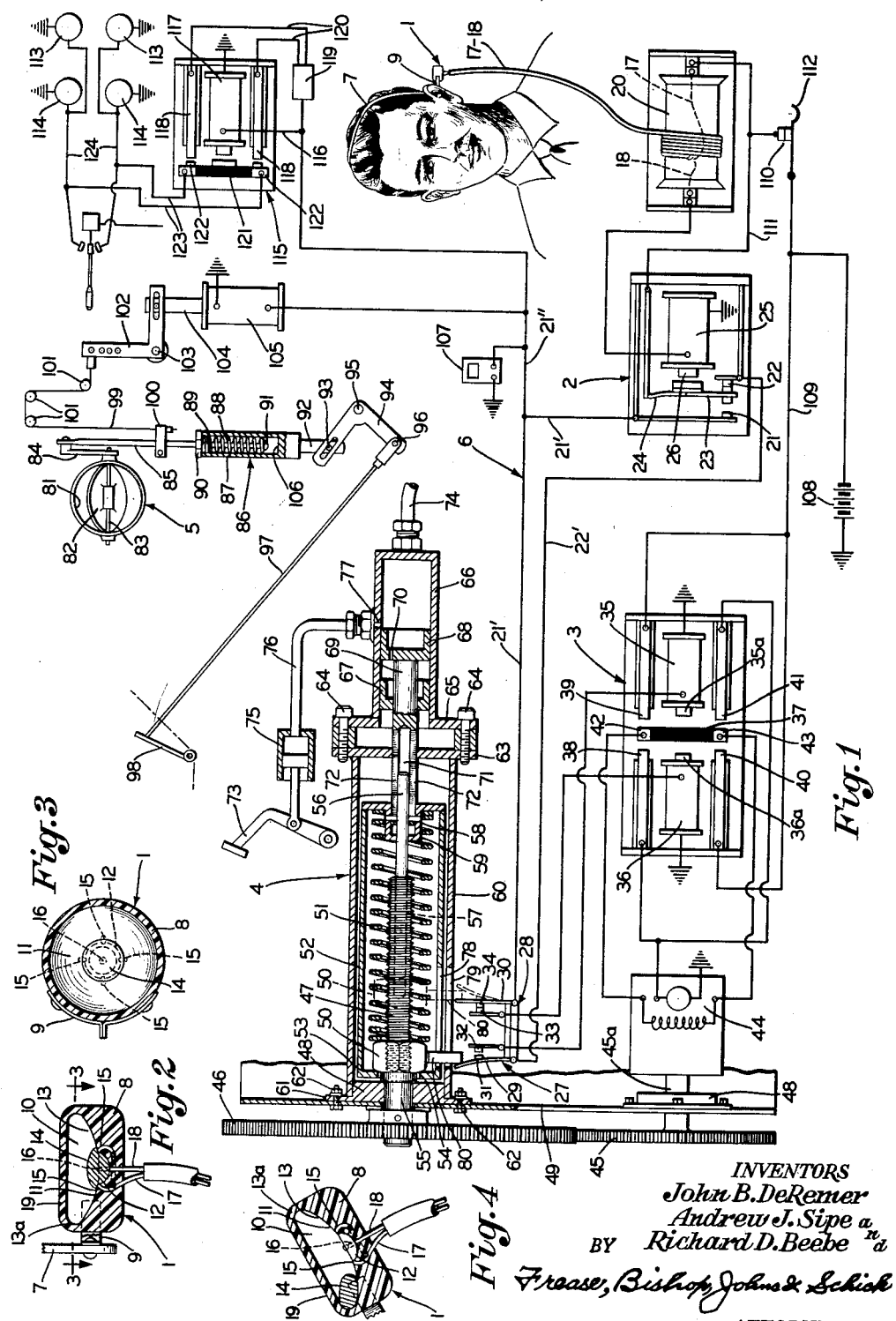

3,013,624
AUTOMATIC BRAKE CONTROL FOR
AUTOMOTIVE VEHICLES
John B. De Remer, 7414 Wales Ave. NW., and Andrew
J. Sipe, 3349 Hall Road NW., both of North Canton,
Ohio, and Richard D. Beebe, 198 Crescent St. SE.,
Massillon, Ohio, assignors of small interest to various
assignees
Filed Oct. 13, 1960, Ser. No. 62,374
6 Claims. (Cl. 180—82)

The invention relates to automatic brake control apparatus for motor-driven vehicles, and the present invention is a continuation-in-part of our copending application Serial No. 851,676, filed November 9, 1959.

In recent years the frequency of automobile accidents on the highways has aroused much interest in providing means for preventing accidents. Various devices have been proposed for assuring positive reaction, such as decelerating and stopping the vehicle or in creating a noise to awaken the driver, in response to the driver's relaxation due to unconsciousness.

One such device has been the use of a steering wheel having movable hand grips which when released cause an immediate deceleration and braking of a vehicle. Such a device on a steering wheel, however, is objectionable for several reasons, including the expense of such a steering wheel as well as the fact that all drowsy drivers do not release the steering wheel immediately, for which reason the vehicle proceeds without coming to a stop as soon as it should.

The device of the present invention is dependent upon a more immediate reaction of most drivers due to drowsiness and unconsciousness. An alert conscious driver normally holds his head upright. The device of the present invention is dependent upon that fact and provides a mercury switch which is attached to the driver's head in a comfortable manner. So long as the operator's head is turned through normal movements the switch maintains a closed circuit without setting the decelerating and braking means into operation. However, as soon as the driver's head nods forward, sideways, or backwards beyond limits normally desirable for proper control of a vehicle, the mercury switch is opened, which causes deceleration and stopping of the vehicle.

Accordingly, it is a primary object of the invention to provide a brake control device for a motor-driven vehicle adapted to be automatically controlled by a tilt-responsive switch.

Another object of the invention is to provide such a brake control device which may be easily and readily installed on any vehicle provided with a hydraulic brake system.

A further object of the invention is to provide an automatic brake control device of the character referred to which is simple and inexpensive in construction and efficient in operation.

A still further object of the invention is to provide an automatic brake control device of this character which is operated by a reversing motor controlled by a novel arrangement of relays and limit switches.

It is also an object of the invention to provide such an automatic brake control device including screw-operated means operatively connected to the reversing motor for operating a hydraulic cylinder for automatically operating the vehicle brakes.

Another object of the invention is to provide a spring-controlled mechanism operated by the screw-operated means for automatically controlling the application of the hydraulic vehicle brakes.

These and other objects and advantages apparent to those skilled in the art from the following description and claims may be obtained, the stated results, achieved, and the described difficulties overcome by the discoveries, principles, apparatus, parts, elements, combinations, and subcombinations which comprise the present invention, the nature of which is set forth in the following general statement, a preferred embodiment of which—illustrative of the best mode in which applicants have contemplated applying the principles—is set forth in the following description and shown in the drawings, and which is particularly and distinctly pointed out and set forth in the appended claims forming part hereof.

In the accompanying drawings a preferred embodiment of the device of the present invention is illustrated wherein:

FIGURE 1 is a diagrammatic view of the device showing a mercury switch mounted on an operator's head and including an electric circuit;

FIG. 2 is a vertical sectional view through the mercury switch showing the switch disposed in the normally closed position;

FIG. 3 is a horizontal sectional view taken on the lines 3—3 of FIG. 2; and

FIG. 4 is a vertical sectional view of the switch is an open position.

Similar numerals refer to similar parts throughout the several views of the drawing.

The automatic brake control mechanism to which the invention pertains is adapted to be controlled by a tilt-responsive switch supported upon the head of the driver of the vehicle and actuated by excessive tilting movement of the driver's head in any direction.

For the purpose of illustration, the tilt-responsive switch is shown as comprising a particular construction of mercury switch which is disclosed and claimed in our copending application above referred to, of which the present application is a continuation-in-part.

As shown in FIG. 1 of the drawing, the control mechanism comprises the mercury switch indicated generally at 1, relays indicated generally at 2 and 3, brake-actuating means indicated generally at 4 and carburetor valve means indicated generally at 5, said devices being located in an electric circuit indicated generally at 6.

The mercury switch 1 is normally mounted in an upright position on the head of a driver of a motor vehicle, as shown in FIG. 1, such as by a headband 7 of conventional construction. For normal driving conditions the switch 1 is in the closed position as shown in FIG. 2. The switch includes a housing 8 of dielectric material which is secured by a connecting link 9 to the headband 7.

The interior of the switch 1 includes a switch chamber 10 having a lower wall 11. The lower wall 11 includes a central cavity 12 (FIGS. 3 and 4) and an outwardly upwardly sloping wall portion 13 which surrounds the cavity 12 throughout 360°.

A ball of mercury 14 is disposed within the chamber 10 so that in the normal position the mercury 14 is disposed within the cavity 12 as shown in FIG. 2. The cavity 12 is of sufficient depth that the mercury 14 remains therein except when the switch 1 is tilted at an angle of greater than 45° as shown in FIG. 4, in which position the mercury 14 rolls out of the cavity, thereby opening the circuit through contacts 15 and 16 of wires 17 and 18 respectively. The contacts 15 and 16 may be variously disposed within the cavity 12, but as shown in FIGS. 2 and 3, four contacts 15 extend from the wire 17 to equally disposed positions around the upper end of the cavity and the contact 16 is centrally disposed at the bottom of the cavity. Accordingly, when the mercury 14 is disposed in the cavity 12, a closed circuit exists between all or one of the contacts 15 and the contact 16.

As shown in FIGS. 2 to 4, the wall portion 13 surrounding the cavity 12 is curved slightly upwardly and outwardly from the periphery of the cavity at a slight angle sufficient to cooperate with the depth of the cavity 12 to maintain the mercury 14 within the cavity during normal movements of the head of the operator of a motor vehicle.

Although the wall portion 13 extends generally outwardly and upwardly, like a saucer, from the cavity 12, its angle of slope is not steep enough to prevent the mercury 14 from becoming dislodged from the cavity when the operator's head is tilted an abnormal amount, such as at 45° or more, which would occur immediately upon the operator becoming unconscious or drowsy.

The slope of the wall portion 13 is sufficient to cause the mercury 14 to flow back into the cavity 12 as soon as the operator's head is turned upright so that the switch 1 is substantially in the position of FIG. 2. The switch housing is provided with an upwardly and inwardly curved annular wall 13a at the periphery of said saucer-shaped bottom wall 13, and an upper wall 19 connected to said annular wall 13a to maintain the mercury 14 within the chamber 10 at all times.

As shown in FIG. 1, the combined wires 17 and 18 lead to a reel 20 on which the combined wires 17 and 18 are wound. The reel 20 is spring mounted in a conventional manner to permit the driver to move his head within reasonable limits without interfering with normal operation of the switch 1.

The relay 2 is a single-pole, double-acting relay having a pair of contacts 21 and 22 with a contact arm 23 mounted therebetween. The arm 23 is spring biased by a spring 24 into contact with the contact 22. A solenoid 25 has a plunger 26 which is held in the position shown in FIG. 1 during normal driving operations with the mercury switch 1 upright as shown in FIG. 2, whereby the arm 23 engages the contact 22. When the solenoid 25 is inactivated such as when the mercury switch 1 is tilted to open the circuit through the contacts 15 and 16 as shown in FIG. 4, a spring (not shown) in the solenoid thrusts the plunger outwardly against the arm 23 to cause engagement with the contact 21.

As shown in FIG. 1, the contact 22 is connected by wire 22' to a limit switch 27. Likewise, the contact 21 is connected by wire 21' to a limit switch 28. Both limit switches 27 and 28 are associated with the brake actuating means 4. The switches 27 and 28 include similar spring-biased arms 29 and 30 respectively, which normally maintain engagement between contacts 31 and 32 of the limit switch 27 and between contacts 33 and 34 of the limit switch 28 respectively.

The limit switches 27 and 28 are in turn separately connected to solenoids 35 and 36 respectively of the relay 3. The relay 3 is a double-pole, double-throw relay including a movable arm 37 responsive to either of the solenoids 35 and 36 and movable between oppositely disposed pairs of contacts 38 and 39 and 40 and 41. Although the arm 37 is composed of a dielectric material, the opposite ends 42 and 43 thereof are provided with metallic contacts. The purpose of the relay 3 is to actuate a reversible motor 44 in one direction or another for operating the brake actuating means 4.

The motor 44, being a series reverse D.C. motor, is provided with a pinion gear 45 which engages a gear 46 mounted on the end of a screw 47. The screw 47, as well as the motor shaft 45a, are mounted in similar spaced thrust bearings 48 that are secured on a mounting plate 49. A nut 50 is threaded upon the screw 47 and adapted to compress the coil spring 51 which surrounds the screw 47. A tubular housing 52 surrounds the spring 51.

The rear end 53 of the housing is located behind the nut 50 and provided with central opening 54, which receives the unthreaded portion 55 of the screw 47. The forward end of the housing 52, is closed and opposite ends of the spring 51 engage the same and the nut 50.

A rod 56 is guided within the longitudinal bore 57, in the screw 47, and through the inturned hollow boss 59 formed upon the front end of the housing 52. An outer housing 60 surrounds the housing 52 and is provided at its rear end with peripheral flange 61, connected as by bolts 62 to the mounting plate 49. A peripheral flange 63 is formed at the forward end of the housing 60 and connected, as by bolts 64, with the peripheral flange 65 upon the rear end of the brake cylinder 66.

A spaced pair of pistons 67 and 68 are fixed upon the piston rod 69 within the cylinder 66. One or more small apertures 70 may be formed in the piston rod 69 to permit fluid to bleed through to the space between the pistons 67 and 68. The piston rod 69 has central bore 71 within which the guide rod 56 is guided, and diametrically opposed longitudinal slots 72 are formed in the piston rod to accommodate the pins 58 in the hollow boss 59.

The conventional foot-operated brake pedal is shown at 73, which normally operates in conjunction with the cylinder 66. The pistons 67 and 68 in the cylinder 66, when actuated by screw 47, nut 50, spring 51 and rod 56, apply pressure on the brake fluid within the cylinder 66, and through a fluid conduit 74 to the brakes of the vehicle.

In such event, the brake pedal 73, which normally operates in conjunction with the cylinder 66 through the cylinder 75 and conduit 76 in the brake system, is rendered inoperative because the skirt of the piston 68 closes the point of connection 77 between the conduit 76 and the piston.

Longitudinal slots 78 and 79 are formed in the inner and outer housings 52 and 60 to permit movement of the switch actuator projection 80, on the nut 50, therethrough, in order to operate the limit switches 27 and 28.

The valve 5 for the carburetor is of conventional construction and includes an opening 81 through which air enters the carburetor (not shown). This opening is provided with a closure or valve member 82, rotatable about a pin 83 extending across the opening, the outer end of the pin being connected to a lever 84 which rotates the pin.

The end of the lever 84, remote from the pin 83, is pivotally attached to one end of a longitudinally movable rod 85, which is part of a compensating link indicated generally at 86. This compensating link includes the tubular housing 87 within which a portion of the rod 85 is spring loaded by the helical spring 88, as shown in FIG. 1.

One end of the spring 88 is secured, as by a weld 89, to an end closure 90 of the tubular housing 87 and the other end of the spring is secured, as by a weld 91, to the adjacent end of the rod 85.

An extension rod 92 is connected to the end of the tubular housing 87, remote from the closure 90 thereof, and is pivotally connected, as at 93, to one arm of the bell crank 94, pivotally mounted at 95. The other arm of the bell crank 94 is pivotally connected at 96 to one end of the rod 97, the other end of which is secured to the accelerator pedal 98 in conventional manner.

As shown in FIG. 1, the cable 99 is connected at one end to the rod 85 by the bracket 100. This cable is disposed over a plurality of pulleys 101 and is secured at its other end to one arm of a bell crank 102, pivotally mounted at 103. The plunger 104 of a solenoid 105 is attached to the other arm of the bell crank 102.

The solenoid 105, when energized, pulls the plunger 104 downwardly, thereby rotating the bell crank 102 in a clockwise direction. Such movement of the bell crank 102 pulls the rod 85 of the compensating link 86 upwardly, through the cable 99, in order to close the opening of the valve 5.

When the rod 85 is pulled upwardly by the cable 99, the rod operates against the force of the spring 88 within the tubular housing 87, in order to close the accelerator opening 81 of the carburetor, notwithstanding an attempt on the part of the operator to keep it open by manipulation of the accelerator pedal 98.

In other words, when the solenoid 105 is actuated, it renders the accelerator pedal 98 inoperative, due to the particular construction of the compensating arm 86. On the other hand, when the solenoid 105 is inoperative, compression of the accelerator pedal is transferred through the rod 97, the bell crank 94, and the tubular housing 87 to the rod 85, either through the spring 88 or by contact of the end of the rod 85 by the inner surface 106 of the tubular housing 87.

The electric circuit may also include a buzzer 107, connected to the contact 21 of relay 25 through wires 21′ and 21″. Electric power for the circuit is provided by a battery 108, one side of which is connected through wire 109 with the contacts 39 and 40 of the relay 3, and through switch 110 and wire 111 with the reel 20 and the spring-biased contact arm 23 of the relay 2. A hook 112 may be provided on the switch 110, upon which the driver may place the headband 7 of the mercury switch when the same is not in use.

The usual front and rear turn indicator lamps 113 and 114 respectively, as generally provided on automotive vehicles to signal the direction in which the vehicle is to be turned, may also be included in the circuit of the automatic control mechanism.

For such purpose, the lamps 113 and 114 are connected to the wire 21″ through a double pole, double-acting relay indicated generally at 115. A wire 116 connects the wire 21″ to the solenoid 117. The contacts 118 of the relay 115 are connected to the wire 21″ through flasher switch 119 and wires 120.

The relay 115 includes a movable arm 121, responsive to the solenoid 117 and having contacts 122 at its ends for contact with the contacts 118, and connected by wires 123 with the usual circuit wires 124 for the lamps 113 and 114.

The foregoing construction including the elements 81—105 for automatically opening and closing the valve 5, together with the buzzer 107 and lights 108 and 109 are part of the subject matter disclosed in the copending application of John B. De Remer, Serial No. 728,715, filed April 15, 1958, and now Patent No. 2,991,839.

When the mercury switch is tilted as shown in FIG. 4, sufficiently to dislodge the mercury 14 from the cavity 12, the circuit through the contacts 15 and 16 is broken, rendering the solenoid 25 inactive so that the plunger 26 thereof is thrust outwardly by a spring (not shown) against the arm 23 moving said arm against the contact 21 so that the circuit is closed therethrough.

Inasmuch as the circuit through the contacts 33 and 34 of the switch 28 is also closed, the solenoid 36 is actuated to thrust the plunger 36a thereof outwardly against the arm 37, moving the same against the contacts 39 and 41, to close the circuit therethrough, and thence through the motor 44 which actuates the screw 47 and causes the nut 50 to move to the right, as viewed in the drawing.

As the nut 50 moves to the right, as viewed in the drawing, the coil spring 51 will be moved to the right and the housing 52 will thus be moved toward the right by the pressure of the spring 51 until the closed inner end of the hollow boss 59 of said housing contacts the end of the piston rod 69. The spring 51 thus slightly delays operation of the automatic brake control mechanism, so as to compensate for hydraulic pressure in the cylinder 66 and brake line 74.

The motor 44 thus is not started under load, as the initial rotation of the screw 47 through the nut 50 merely moves the nut to the right, pushing the spring 51 against the closed right end of the inner housing 52 and thus pushing the housing 52 toward the right. There will thus be very little if any load on the motor until the closed inner end of the hollow boss 59 contacts the end of the piston rod 69. By this time the motor will have made a number of revolutions and should be running at normal speed.

When the closed inner end of the hollow boss 59 contacts the end of the piston rod 69, further movement of the nut 50 toward the right will start to compress the spring 51, urging the inner housing 52, and with it the piston rod 69, toward the right. Thus a yielding or cushioned pressure will be exerted on the brake fluid, so as to soften the initial application of the brakes in order to prevent the vehicle from skidding into a spin, as would be likely if the brakes were suddenly put on with full pressure while the vehicle is traveling at high speed.

As the piston rod is thus moved to the right, the pistons 67 and 68 within the brake cylinder 66, are actuated to apply pressure on the brake fluid within the cylinder 66 and through the fluid conduit 74 to the brakes in conventional manner.

Further movement of the nut 50 to the right will continue to compress the spring 51, proportionately increasing the pressure on the brakes until sufficient pressure has been exerted to bring the vehicle to a safe stop.

In such event, the brake pedal 73 which normally operates in conjunction with the cylinder 66, through the cylinder 75 and conduit 76 in the brake system, is rendered inoperative because the skirt of the piston 68 closes the point of connection 77 between the conduit 76 and the piston.

Inasmuch as the entire cylinder 66 is filled with brake fluid, including the space between the pistons 67 and 68, it is impossible for the hydraulic fluid to become contaminated with air due to frequent movement of the piston in the cylinder 66, which would be the case if the space between the pistons 67 and 68 were not filled with brake fluid.

When the nut 50 on the screw 47 is in the normal position, as shown in full lines in FIG. 1, the limit switch 27 is held open by the switch actuator projection 80 on the nut, and as the nut is moved to the right by the screw 47, the spring-biased arm 29 brings the contacts 31 and 32 into engagement.

When the nut 50 moves to the operated position shown in broken lines in FIG. 1, the switch actuator projection 80 thereon engages the upper end of the spring-biased arm 30, thereby breaking the circuit through the contacts 33 and 34. Even though the brakes have been fully applied to stop the vehicle, and the pressure of brake fluid in the cylinder 66 and line 74 will prevent further movement of the piston rod 69 and inner housing 52 to the right, continued movement of the nut 50 to the right will further compress the spring 51 until the nut 50 reaches the broken line position of FIG. 1. At this point the switch actuator projection 80, on the nut 50, will contact the spring-biased arm 30, opening the contacts 33—34 and stopping the motor 44. Operation of the screw 47 in one direction or the other is, of course, dependent upon operation of the motor 44 and in turn is dependent upon the relay 3.

Under normal operating conditions, when the mercury switch is upright as shown in FIG. 1, the circuit is closed through the arm 23 and contact 22 of the relay 2. The contacts 31 and 32 in the limit switch 27, however, will be open so that normal driving operation prevails.

During such driving operation, the circuit is closed through contacts 33 and 34 of the switch 28, and the circuit is open through the contact 21 in the relay 2, thereby maintaining the status quo.

When the switch actuator projection 80 breaks the circuit through the switch 28, by moving the spring-biased arm 30 to the right, as viewed in the drawing, the motor 44 stops turning and the brakes are applied to the vehicle.

When the mercury switch is again turned upright, so that the mercury 14 enters the cavity 12 and closes the circuit through the contacts 15 and 16, the solenoid 25 is actuated to pull the plunger 26 away from the arm 23 permitting the same to again engage the contact 22.

The circuit being closed through the limit switch 27, actuates the solenoid 35, which thrusts the plunger 35a thereof outwardly against the arm 37 closing the circuit through the contacts 38 and 40 of the relay 3.

The polarity in the motor 44 is thus reversed, whereby the screw 47 is turned in the opposite direction and causes the nut 50 to return to the original position shown in full lines in FIG. 1, whereby the brakes of the vehicle are released.

It should be understood that the automatic brake control mechanism above described, including the reversing motor and the several relays, may be enclosed as a unit in a case or housing, and that it may be easily and readily installed upon a motor-driven vehicle by cutting the hydraulic brake line on the vehicle and connecting the cylinder 66 of the automatic brake control mechanism to the vehicle's hydraulic brake line between the pedal-operated cylinder 75 and the brakes.

In the foregoing description certain terms have been used for brevity, clearness and understanding, but no unnecessary limitations are to be implied therefrom as such words are used for descriptive purposes herein and are intended to be broadly construed.

It should be understood that the applicants have foreseen the necessity of a warning signal to the drivers of other motor-driven vehicles, and have therefore included a safety device in the single unit. By running wires from the unit to the original turn signal lights on the vehicle, both left and right signal lights will flash automatically and give drivers of other vehicles warning. This device is so arranged that it can be easily and readily installed without alteration to the original turn signal lights.

It will be obvious from the above that the automatic brake control mechanism includes a reversing motor and several relays, all enclosed as a single unit in a case or housing, and that it can be easily and readily installed upon any motor-driven vehicle, either old or new, with or without power brakes, by cutting the hydraulic line on the vehicle and connecting the cylinder 66 of the automatic brake control mechanism to the vehicle's hydraulic brake line between the pedal-operated cylinder 75 and the brakes.

It will also be obvious that the compensating link is as important as the accelerator pedal. If the driver becomes drowsy or unconscious, the compensating link allows the butterfly valve to close the carburetor, bringing the motor down to idling speed. Also, the compression of the motor helps to stop the vehicle in the same manner as when the normal driver takes his foot off of the accelerator pedal and applies the brakes with the brake pedal.

Moreover, the embodiment of the improved construction illustrated and described herein is by way of example and the scope of the present invention is not limited to the exact details of construction shown.

Having now described the features, constructions and principles of the invention, the characteristics of the new automatic vehicle control construction, and the advantageous, new and useful results provided; the new and useful discoveries, principles, parts, elements, combinations, subcombinations, structures and arrangements, and mechanical equivalents thereof obvious to those skilled in the art are set forth in the appended claims.

We claim:

1. Automatic brake control means adapted to be controlled by a tilt-responsive switch for a motor vehicle having hydraulic brakes, said automatic brake control means comprising a relay spring-biased in one position and operative to a second position by a solenoid connected to the tilt-responsive switch, a reversible motor, a rotatable screw driven by the motor, a nut movable longitudinally on the screw, spaced limit switches operated by said nut, one limit switch being connected to one position of the relay, the other limit switch being connected to the other position of the relay, a double-pole, double-throw relay having two solenoids, one of said last-named solenoids being connected to each limit switch, said double-pole, double-throw relay controlling operation of the reversible motor in opposite directions, and spring-loaded means operated by said screw for yieldingly applying and for releasing the hydraulic brakes.

2. Automatic brake control means adapted to be controlled by a tilt-responsive switch for a motor vehicle having hydraulic brakes, said automatic brake control means comprising a relay spring-biased in one position and operative to a second position by a solenoid connected to the tilt-responsive switch, a reversible motor, a rotatable screw driven by the motor, a nut movable longitudinally on the screw, spaced limit switches operated by said nut, one limit switch being connected to one position of the relay, the other limit switch being connected to the other position of the relay, a double-pole, double-throw relay having two solenoids, one of said last-named solenoids being connected to each limit switch, said double-pole, double-throw relay controlling operation of the reversible motor in opposite directions, and means comprising a housing surrounding said screw and movable longitudinally relatively thereto, a coil spring within the housing, said coil spring being interposed between the nut and one end of the housing for urging the other end of the housing into contact with the nut, a hydraulic cylinder, and piston means within said cylinder and operatively associated with said housing for yieldingly applying and for releasing the hydraulic brakes.

3. Automatic brake control means adapted to be controlled by a tilt-responsive switch for a motor vehicle having hydraulic brakes, said automatic brake control means comprising a relay spring-biased in one position and operative to a second position by a solenoid connected to the tilt-responsive switch, a reversible motor, a rotatable screw driven by the motor, a nut movable longitudinally on the screw, spaced limit switches operated by said nut, one limit switch being connected to one position of the relay, the other limit switch being connected to the other position of the relay, a double-pole, double-throw relay having two solenoids, one of said last-named solenoids being connected to each limit switch, said double-pole, double-throw relay controlling operation of the reversible motor in opposite directions, and means comprising a housing surrounding said screw and movable longitudinally relative thereto, one end of said housing being located behind said nut, a coil spring within the housing between said nut and the other end of the housing, a hydraulic cylinder, and piston means within said cylinder and operatively associated with said housing for yieldingly applying and for releasing the hydraulic brakes.

4. Automatic brake control means adapted to be controlled by a tilt-responsive switch for a motor vehicle having hydraulic brakes, said automatic brake control means comprising a relay spring-biased in one position and operative to a second position by a solenoid connected to the tilt-responsive switch, a reversible motor, a rotatable screw driven by the motor, a nut movable longitudinally on the screw, spaced limit switches operated by said nut, one limit switch being connected to one position of the relay, the other limit switch being connected to the other position of the relay, a double-pole, double-throw relay having two solenoids, one of said last-named solenoids being connected to each limit switch, said double-pole, double-throw relay controlling operation of the reversible motor in opposite directions, and means comprising a housing surrounding said screw and movable longitudinally relative thereto, one end of said housing being located behind said nut, a coil spring within the housing between said nut and the other end of the housing, a hollow boss on said other end of the housing, a hydraulic cylinder, piston means within said cylinder, and a piston rod connected to said piston means and having one end located in said hollow boss for yieldingly applying and for releasing the hydraulic brakes.

5. Automatic brake control means adapted to be controlled by a tilt-responsive switch for a motor vehicle having hydraulic brakes, said automatic brake control means comprising a relay spring-biased in one position and operative to a second position by a solenoid connected to the tilt-responsive switch, a reversible motor, a rotatable screw driven by the motor, a nut movable longitudinally on the screw, spaced limit switches operated by said nut, one limit switch being connected to one position of the relay, the other limit switch being connected to the other position of the relay, a double-pole, double-throw relay having two solenoids, one of said last-named solenoids being connected to each limit switch, said double-pole, double-throw relay controling operation of the reversible motor in opposite directions, and means comprising a housing surrounding said screw and movable longitudinally relative thereto, one end of said housing being located behind said nut, a coil spring within the housing between said nut and the other end of the housing, a hollow boss on said other end of the housing, a hydraulic cylinder, piston means within said cylinder, and a hollow piston rod connected to said piston means and having one end located in said hollow boss, and a guide rod upon the screw and extending into said hollow piston rod, for yieldingly applying and for releasing the hydraulic brakes.

6. Automatic brake control means adapted to be controlled by a tilt-responsive switch for a motor vehicle having hydraulic brakes, said automatic brake control means comprising a relay spring-biased in one position and operative to a second position by a solenoid connected to the tilt-responsive switch, a reversible motor, a rotatable screw driven by the motor, a nut movable longitudinally on the screw, spaced limit switches operated by said nut, one limit switch being connected to one position of the relay, the other limit switch being connected to the other position of the relay, a double-pole, double-throw relay having two solenoids, one of said last-named solenoids being connected to each limit switch, said double-pole, double-throw relay controlling operation of the reversible motor in opposite directions, and means comprising a housing surrounding said screw and movable longitudinally relative thereto, one end of said housing being located behind said nut, a coil spring within the housing between said nut and the other end of the housing, a hollow boss on said other end of the housing, a hydraulic cylinder, piston means within said cylinder, and a hollow piston rod connected to said piston means and having one end located in said hollow boss, and a guide rod upon the screw and extending into said hollow piston rod, said hollow piston rod having longitudinal slots therein, and transverse pins said hollow boss, the ends of said pins being located in said longitudinal slots, for yieldingly applying and for releasing the hydraulic brakes.

References Cited in the file of this patent

UNITED STATES PATENTS

| | | |
|---|---|---|
| 1,896,035 | Williams | Jan. 31, 1933 |
| 2,172,116 | Warren | Sept. 5, 1939 |
| 2,493,377 | Zeilman | Jan. 3, 1950 |
| 2,804,160 | Rashid | Aug. 27, 1957 |

FOREIGN PATENTS

| | | |
|---|---|---|
| 201,255 | Canada | June 22, 1920 |